United States Patent
Yasuda et al.

(10) Patent No.: US 9,722,782 B2
(45) Date of Patent: Aug. 1, 2017

(54) INFORMATION PROCESSING METHOD, RECORDING MEDIUM, AND INFORMATION PROCESSING APPARATUS

(71) Applicant: FUJITSU LIMITED, Kawasaki-shi, Kanagawa (JP)

(72) Inventors: Masaya Yasuda, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 14/930,752

(22) Filed: Nov. 3, 2015

(65) Prior Publication Data

US 2016/0182226 A1  Jun. 23, 2016

(30) Foreign Application Priority Data

Dec. 22, 2014 (JP) ................................. 2014-259282

(51) Int. Cl.
*H04L 9/00* (2006.01)
*H04L 9/32* (2006.01)
(Continued)

(52) U.S. Cl.
CPC ............ *H04L 9/0819* (2013.01); *G06F 21/32* (2013.01); *H04L 9/008* (2013.01); *H04L 9/0869* (2013.01);
(Continued)

(58) Field of Classification Search
CPC ..... H04L 9/0819; H04L 9/008; H04L 9/0869; H04L 9/3093; H04L 9/3231; H04L 63/0861; G06F 21/32
(Continued)

(56) References Cited

U.S. PATENT DOCUMENTS 6,760,438 B1 * 7/2004 Hui ..................... H04L 1/0041
   370/347
7,620,818 B2 * 11/2009 Vetro .................. H04L 9/0866
   382/115

(Continued)

FOREIGN PATENT DOCUMENTS

JP  2008-521025  6/2008
JP  2008-269534  11/2008
(Continued)

OTHER PUBLICATIONS

Extended European Search Report dated Apr. 28, 2016 for corresponding European Patent Application No. 15194044.2, 8 pages.
(Continued)

*Primary Examiner* — Hosuk Song
(74) *Attorney, Agent, or Firm* — Fujitsu Patent Center

(57) ABSTRACT

An information processing method according to an embodiment causes a computer to execute a process of receiving an input of matching information encrypted with an encryption algorithm allowing a Hamming distance to be calculated with the matching information encrypted. The information processing method also causes the computer to execute a process of calculating a first Hamming distance between the received matching information and registered information that is different from encrypted registered information of a user, the registered information being encrypted with the encryption algorithm, using a processor. The information processing method also causes the computer to execute a process of determining legitimacy of the matching information based on whether the calculated first Hamming distance falls into a distance distribution representing matches with another person that is different from the user, using a processor.

6 Claims, 6 Drawing Sheets

(51) Int. Cl.
*H04L 9/08* (2006.01)
*G06F 21/32* (2013.01)
*H04L 29/06* (2006.01)
*H04L 9/30* (2006.01)

(52) U.S. Cl.
CPC .......... *H04L 9/3093* (2013.01); *H04L 9/3231* (2013.01); *H04L 63/0861* (2013.01); *H04L 2209/24* (2013.01)

(58) Field of Classification Search
USPC ............. 380/28; 713/168, 82, 186, 189, 182
See application file for complete search history.

(56) References Cited

U.S. PATENT DOCUMENTS

| | | | | |
|---|---|---|---|---|
| 7,894,600 | B2* | 2/2011 | Sato | G06F 21/32 356/71 |
| 8,700,912 | B2* | 4/2014 | Kindarji | G06K 9/00087 382/115 |
| 9,036,876 | B2* | 5/2015 | Rane | G06K 9/00093 382/124 |
| 9,077,509 | B2* | 7/2015 | Tuyls | H04L 9/008 |

| | | |
|---|---|---|
| 2009/0006855 A1 | 1/2009 | Tuyls et al. |
| 2010/0329448 A1 | 12/2010 | Rane et al. |
| 2011/0026781 A1 | 2/2011 | Osadchy et al. |

FOREIGN PATENT DOCUMENTS

| | | |
|---|---|---|
| JP | 2011-013672 | 1/2011 |
| WO | 2006/054208 | 5/2006 |

OTHER PUBLICATIONS

Wong, Kok-Seng et al.,"A Privacy-Preserving Biometric Matching Protocol for Iris Codes Verification", 2012 Third FTRA International Conference on Mobile, Ubiquitous, and Intelligent Computing, IEEE, Jun. 26, 2016, pp. 120-125, XP032240336.

Yasuda, Masaya et al., "Secure Pattern Matching using Somewhat Homomorphic Encryption", Cloud Computing Security Workshop, ACM, Nov. 8, 2013, pp. 65-76, 2 Penn Plaza, Suite 701, New York, NY, XP058034246.

Yasuda, Masaya et al., "Packed Homomorphic Encryption Based on Ideal Lattices and Its Application to Biometrics", Sep. 2, 2013, Correct System Design; [Lecture Notes in Computer Science; Lect. Notes Computer], Springer International Publishing, CHAM, pp. 55-74, XP047037853.

\* cited by examiner

INFORMATION PROCESSING METHOD, RECORDING MEDIUM, AND INFORMATION PROCESSING APPARATUS

CROSS-REFERENCE TO RELATED APPLICATIONS

This application is based upon and claims the benefit of priority of the prior Japanese Patent Application No. 2014-259282, filed on Dec. 22, 2014, the entire contents of which are incorporated herein by reference.

FIELD

The embodiment discussed herein is related to an information processing method, a recording medium, and an information processing apparatus.

BACKGROUND

While more strict regulations for protecting private information and confidential information have come to be enforced, a market for services using such information is now expanding. Furthermore, currently used are concealing technologies allowing the data of private information or confidential information to be used while some protection is applied to the data. Among such concealing technologies, some using encryption or statistical technologies are available, depending on the type of data or service requirements.

A known example of the concealing technology using encryption is a homomorphic encryption technology. Homomorphic encryption is a type of public key encryption using a pair of different keys for encryption and decryption, and is an encryption allowing encrypted data to be operated. For example, the characteristic expressed in Equation (1) or (2) is established for a homomorphic encryption function E related to addition or multiplication of plaintexts m1 and m2.

$$E(m1)+E(m2)=E(m1+m2) \quad (1)$$

$$E(m1)*E(m2)=E(m1*m2) \quad (2)$$

The encryption for which Equation (1) is established is referred to as being homomorphic for addition, and the encryption for which Equation (2) is established is referred to as being homomorphic for multiplication.

Homomorphic encryption allows addition or multiplication of encrypted texts to output another encrypted text resultant of the operation such as the addition or the multiplication, without requiring decoding of the encrypted texts. This characteristic of the homomorphic encryption is used in fields such as electronic voting, electronic cash, and cloud computing. Representative examples of homomorphic encryption include Rivest Shamir Adleman (RSA) encryption enabled for multiplication, and additive ElGamal encryption enabled for addition.

Homomorphic encryption is recently known for being used for both addition and multiplication. Also known is homomorphic encryption that can be used for both addition and multiplication, and is feasible from the viewpoint of processing performance, as well as from the viewpoint of the encrypted data size.

An exemplary homomorphic encryption will now be explained. Before generating an encryption key, mainly three key generation parameters (n, q, t) are prepared. n herein is an integer that is a power of two, and is referred to as a lattice dimension. q is a prime number, and t is an integer less than the prime number q. The encryption key generation starts from a step of randomly generating an n-dimensional polynomial sk having coefficients that are small as a secret key. The smallness of each coefficient is restricted by a parameter σ. Generated at the subsequent steps are an n-dimensional polynomial a1 each coefficient of which is smaller than q, and another n-dimensional polynomial e having small coefficients.

$a0=-(a1*sk+t*e)$ is then calculated, and the pair (a0, a1) is defined as a public key pk. In calculating the polynomial a0, a polynomial of the degree less than n is always calculated by calculating $x^n=-1$, $x^{n+1}=-x$, ... and so on in polynomials of the $n^{th}$ degree or higher. For the coefficients of a polynomial, remainders of dividing the respective coefficients by the prime number q are output. The space for performing such an operation is often scholarly expressed as $Rq:=Fq[x]/(x^{n+1})$.

At the subsequent step, three n-dimensional polynomials u, f, and g having small coefficients are randomly generated, for a piece of plaintext data m expressed by an $n^{th}$ degree polynomial each coefficient of which is smaller than t, and for the public key pk=(a0, a1). The data Enc(m, pk)=(c0, c1) that is an encryption of the plaintext data m is then defined as follows. (c0, c1) are calculated as $c0=a0*u+t*g+m$ and $c1=a1*u+t*f$. These calculations are performed as operations in the space Rq.

An encryption addition Enc(m1, pk)+Enc(m2, pk) is performed to two encrypted texts Enc(m1, pk)=(c0, c1) and Enc(m2, pk)=(d0, d1), as (c0+d0, c1+d1), and an encryption multiplication Enc(m1, pk)*Enc(m2, pk) is performed as (c0+d0, c0*d1+c1*d0, c1*d1). It is noted that, when the encryption multiplication is performed in the manner described above, the data size of the encrypted texts is changed from a two-component vector to a three-component vector.

In the decrypting process, the encrypted text c=(c0, c1, c2, ...) (it is assumed herein that the number of components of the encrypted text data has increased as a result of encryption operations such as a plurality of encryption multiplications) is decrypted by calculating Dec(c, sk)=[c0+ c1*sk+c2*sk2+ ... ]q mod t, using the secret key sk. A remainder w of dividing an integer z by q is calculated for a value of [z]q. If w<q, [z]q=w is output. If w≥q, [z]q=w-q is output. a mod t herein means a remainder of dividing the integer a by t.

To facilitate understanding, examples using actual numbers will be provided below.

secret key sk=Mod(Mod(4,1033)*$x^3$+Mod(4,1033)
 *$x^2$+Mod(1,1033)*x,$x^4$+1)

public key pk=(a0,a1)

a0=Mod(Mod(885,1033)*$x^3$+Mod(519,1033)*$x^2$+
 Mod(621,1033)*x+Mod(327,1033),$x^4$+1)

a1=Mod(Mod(661,1033)*$x^3$+Mod(625,1033)*$x^2$+
 Mod(861,1033)*x+Mod(311,1033),$x^4$+1)

Enc(m,pk)=(c0,c1)

It is assumed herein that the plaintext data m=$3+2x+2x^2+2x^3$.

c0=Mod(Mod(822,1033)*$x^3$+Mod(1016,1033)*$x^2$+
 Mod(292,1033)*x+Mod(243,1033),$x^4$+1)

c1=Mod(Mod(840,1033)*$x^3$+Mod(275,1033)*$x^2$+
 Mod(628,1033)*x+Mod(911,1033),$x^4$+1)

In these values above, the key generation parameters (n, q, t) are set to (4, 1033, 20), respectively. Mod(a, q) denotes the remainder of dividing the integer a by the prime number q, and $\text{Mod}(f(x), x^4+1)$ denotes the polynomial that is the remainder of dividing the polynomial $f(x)$ by the polynomial $x^4+1$, where $x^4=-1$, $x^5=x$, ..., and so on.

There is also a technique for accelerating a secrecy distance computation using homomorphic encryption. The acceleration technique will now be explained. The technique makes use of the characteristic that the encryption scheme described above is enabled for polynomial operation. Specifically, the encryption scheme has a characteristic that, given two encrypted texts $\text{Enc}(f(x), pk)$ and $\text{Enc}(g(x), pk)$ corresponding to two polynomials $f(x)$ and $g(x)$ of a degree less than n, a polynomial addition can be performed to the encrypted texts as $\text{Enc}(f(x), pk)+\text{Enc}(g(x), pk)=\text{Enc}(f(x)+g(x), pk)$. A polynomial multiplication can also be performed to the encrypted texts as $\text{Enc}(f(x), pk)*\text{Enc}(g(x), pk)=\text{Enc}(f(x)*g(x), pk)$.

Given two vectors $A=(a0, a1, ...)$ and $B=(b0, b1, ...)$, the acceleration technique calculates the inner product $\Sigma ai*bi$ at a high speed, with A and B encrypted. Specifically, an ascending order polynomial $Pm_1(A)=\Sigma ai\hat{}i$ is generated for the vector A, and a descending order polynomial with a negative sign is generated for the vector B as $Pm_2(B)=-\Sigma bi\hat{}(n-i)$. These polynomials are then homomorphically encrypted as $\text{Enc}(Pm_1(A), pk)$, $\text{Enc}(Pm_2(B), pk)$.

To multiply these two encrypted texts, the polynomial multiplication $Pm_1(A)*Pm_2(B)$ is performed with these texts encrypted, and the constant term of the multiplication will be the inner product $\Sigma ai*bi$. In other words, the constant term of the decryption result of the encrypted multiplication will exactly be the inner product $\Sigma ai*bi$. With this technique, computation can be performed efficiently, compared with the technique in which each of the components A and B are encrypted and their inner product is computed. Furthermore, by applying this high-speed inner product computation, Hamming distance calculation or L2 norm computation can be performed at a high speed with data encrypted.

An exemplary application that uses the homomorphic encryption and the technique for performing the Hamming distance calculation or the L2 norm computation at a high speed with data encrypted is a biometric authentication system that uses biological information such as a finger print or veins for authentication. In such a biometric authentication system, the confidentiality of the biological information can be improved by performing the Hamming distance calculation to the biological information protected with the homomorphic encryption. A related art example is disclosed in Japanese National Publication of International Patent Application No. 2008-521025.

A biometric authentication system in which the biometric authentication is achieved by performing the Hamming distance calculation to the encrypted biological information, however, has a shortcoming of having difficulty in detecting fraudulent matching data.

Some typical examples of spoofing attacks intended to achieve fraudulent authentication in a biometric authentication system include a retransmission attack by eavesdropping the communication channel, spoofing by inputting biological information using some artifact such as a gummy finger or a printed material, and spoofing by transmitting fraudulent (fake) authentication data.

Specifically, to spoof by transmitting fraudulent matching data, which is one of the example mentioned above, when the Hamming distance calculation is calculated, the attacker will transmit a piece of fraudulent matching data outputting a distance, with respect to biological information (template) registered in advance, that is smaller than a threshold for permitting the authentication to be successful. For example, transmitted is $B=(b0, b1, ..., b2047)=(1, 0, 1, 0, ..., 1, e)$ that is the fake authentication data, with respect to a piece of binary data $A=(a0, a1, ..., a2047)$ registered as a template.

The last component of B is not a piece of binary data, but is a selection of an integer e having the absolute value of $1024-\theta$, where $\theta$ is a threshold for determining whether to allow the authentication to succeed by calculating the Hamming distance with respect to the template. In other words, the authentication succeeds when a distance $d(A, B)$ between the two biological feature vectors (biological information) A and B is smaller than the threshold $\theta$.

In this example, because the distance $d(A, B)$ between the legitimate template A and the fraudulent matching data B is $\Sigma(ai+bi-2ai*bi)$, the resultant distance may be 50 percent probability, which is smaller than the threshold $\theta$, depending on how e is selected, and the authentication may end up being successful. At this time, because the authentication data is homomorphically encrypted, it is difficult to detect that the data is fraudulent matching data.

SUMMARY

According to an aspect of an embodiment, an information processing method in which a computer executes a process includes receiving an input of matching information encrypted with an encryption algorithm allowing a Hamming distance to be calculated with the matching information encrypted, and calculating a first Hamming distance between the received matching information and registered information that is different from encrypted registered information of a user, the registered information being encrypted with the encryption algorithm, using a processor; and determining legitimacy of the matching information based on whether the calculated first Hamming distance falls into a distance distribution representing matches with another person that is different from the user, using a processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
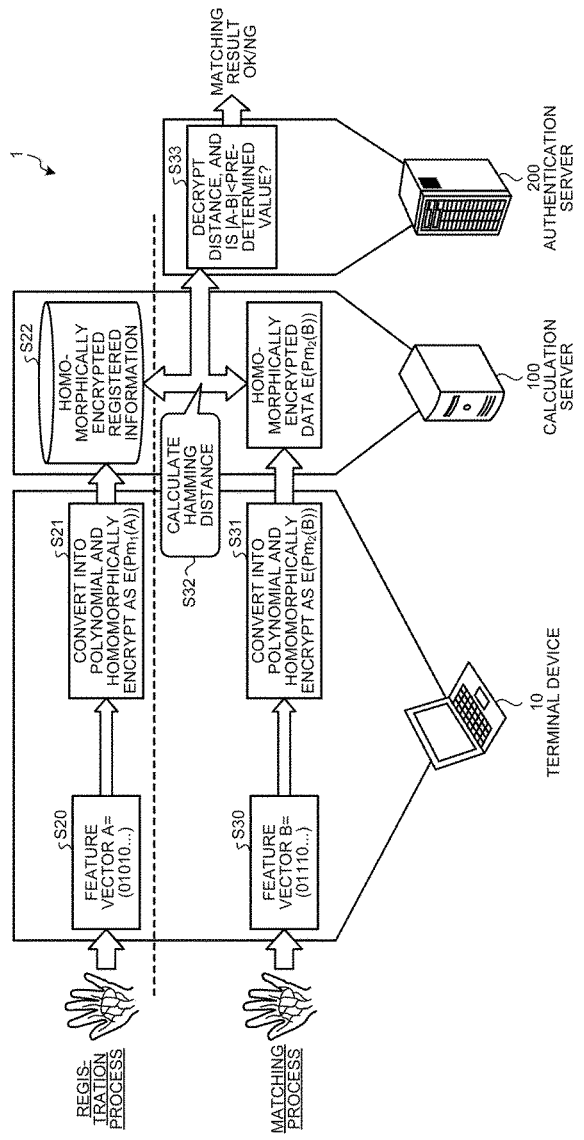
FIG. 1 is a schematic for generally explaining an authentication system.

Preferred embodiments of the present invention will be explained with reference to accompanying drawings.

In the embodiment, elements having the same function will be assigned with the same reference numerals, and redundant explanations thereof are omitted. The information processing method, the information processing program, and the information processing apparatus explained in the embodiment are merely exemplary, and are not intended to limit the scope of the present invention in any way. The embodiments described below may be combined as appropriate, within the scope that is not contradictory.

To begin with, an authentication system for performing biometric authentication by calculating a Hamming distance from biological information, with the biological information is encrypted, will now be explained generally. FIG. 1 is a schematic for generally explaining an authentication system 1. As illustrated in FIG. 1, the authentication system 1 includes a terminal device 10, a calculation server 100, and an authentication server 200. The terminal device 10, the calculation server 100, and the authentication server 200 are connected communicatively to one another.

The terminal device 10 is a personal computer (PC) or a smart phone, for example, and is a terminal device from which user's biological information is registered and matched in the authentication system 1. Before registering or matching biological information, the terminal device 10 acquires user's biological information, and encrypts the acquired biological information with homomorphic encryption, and transmits the encrypted biological information to the calculation server 100. Illustrated in the embodiment is an example in which palm veins are acquired as user's biological information, but the biological information may be a finger print, as another example, without any limitation.

To register biological information, the terminal device 10 collects the user's biological information using a sensor not illustrated, for example, and generates a feature vector A as feature information based on the collected biological information (S20). The terminal device 10 then generates (converts) an ascending order polynomial ($Pm_1(A)$) for the generated feature vector A. The terminal device 10 then homomorphically encrypts the polynomial $Pm_1(A)$ using an algorithm enabled for Hamming distance (secrecy distance) calculation with encrypted information, e.g., using a public key of homomorphic encryption (S21).

The terminal device 10 then transmits the homomorphically encrypted data $E(Pm_1(A))$ to the calculation server 100. When the homomorphically encrypted data $E(Pm_1(A))$ is received from the terminal device 10, the calculation server 100 stores the data $E(Pm_1(A))$ in a database, for example, as user's registered information (S22). This user's registered information is sometimes referred to as a template in the field of biometric authentication.

To match biological information, the terminal device 10 generates a feature vector B based on the biological information acquired in the same manner as when the template is registered, as a piece of feature information (S30). The terminal device 10 then generates a descending order polynomial ($Pm_2(B)$) from the generated feature vector B (converts the generated feature vector B). The terminal device 10 then homomorphically encrypts the generated polynomial $Pm_2(B)$ using an algorithm enabled for Hamming distance (secrecy distance) calculation with the polynomials encrypted, e.g., using a public key of the homomorphic encryption (S31).

The terminal device 10 then transmits the homomorphically encrypted data $E(Pm_2(B))$ to the calculation server 100. When the data $E(Pm_2(B))$ is received from the terminal device 10, the calculation server 100 calculates a Hamming distance between the data $E(Pm_2(B))$ and the data $E(Pm_1(A))$ stored as the registered information, with these pieces of data encrypted (S32). The result of the Hamming distance calculation is transmitted to the authentication server 200 where the secret key of the homomorphic encryption is located.

When the result of the Hamming distance calculation is received from the calculation server 100, the authentication server 200 decrypts the result using the secret key of the homomorphic encryption, and compares a plaintext that is the Hamming distance resultant of the decryption with a preset threshold. In this comparison, if the Hamming distance that is the plaintext is smaller than the threshold, the authentication server 200 transmits OK as a result of matching, meaning that the authentication has succeeded, to the terminal device 10. If the Hamming distance that is the plaintext is equal to or larger than the threshold, the authentication server 200 transmits NG as a result of matching, indicating that the authentication has failed, to the terminal device 10 (S33).

At this time, only transmitted to the calculation server 100 in the authentication system 1 is the homomorphically encrypted feature information, and the calculation server 100 is not provided with the secret key. Therefore, it is difficult to know the user's feature information on the side of the calculation server 100. Furthermore, because the authentication server 200 receives the result of the Hamming distance calculation, and decrypts the result with the secret key, it is also difficult to know the user's feature information on the side of the authentication server 200. Therefore, unless the authentication server 200, which has the secret key, colludes with the calculation server 100, users can receive the authentication service while keeping the user's feature information protected (concealed by encryption).

Figure 2:
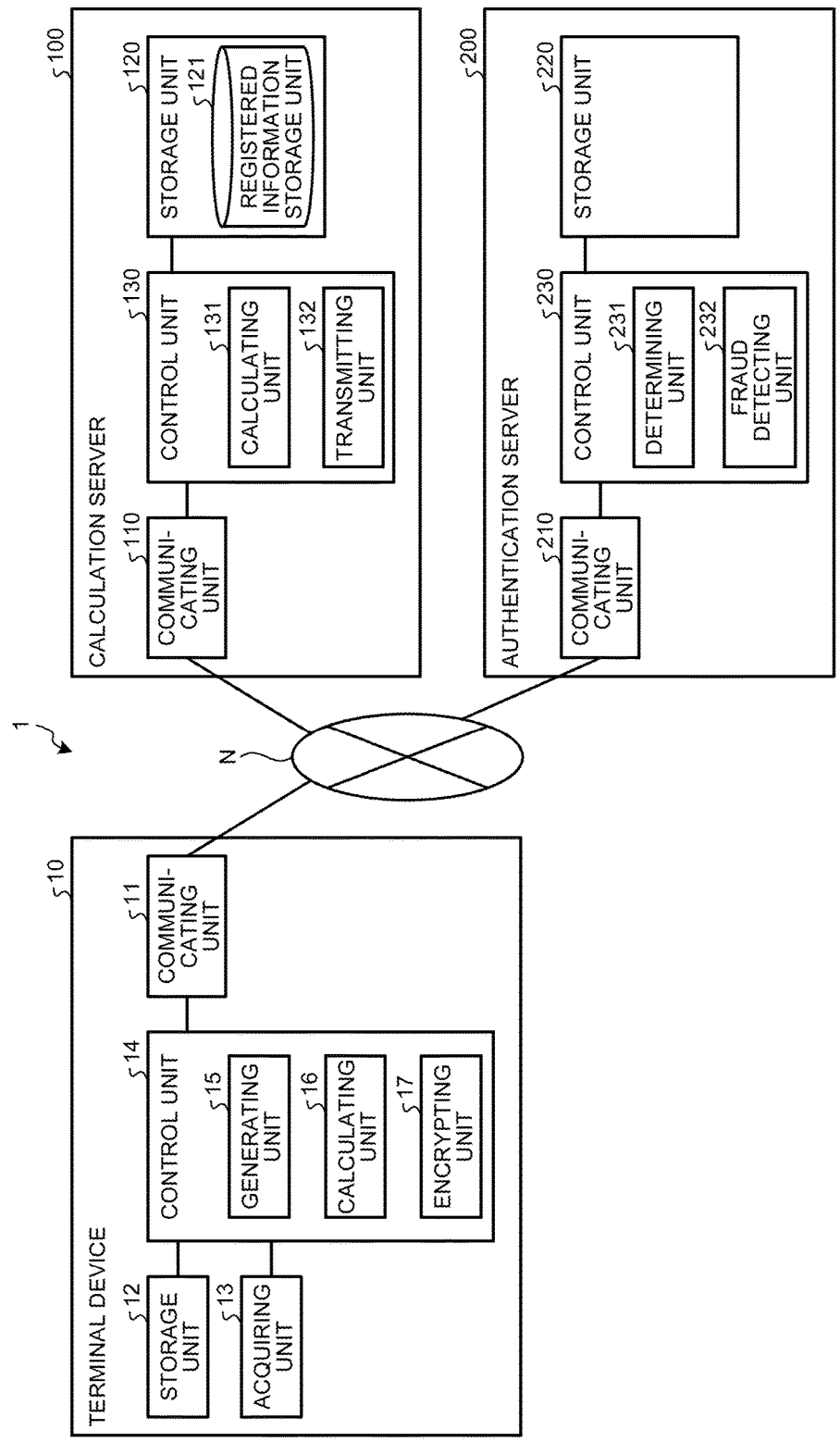
FIG. 2 is a block diagram illustrating an exemplary configuration of the authentication system according to an embodiment of the present invention.

FIG. 2 is a block diagram illustrating an exemplary configuration of the authentication system 1 according to the embodiment. As illustrated in FIG. 2, the authentication system 1 includes the terminal device 10, the calculation server 100, and the authentication server 200 that are communicatively connected to one another over a network N.

Illustrated is an example in which the authentication system 1 includes one terminal device 10, but the number of the terminal device 10 is not limited to one, and the authentication system 1 may have any number of terminal devices 10. The network N may be any types of wired or wireless communication network, examples of which include the Internet, a local area network (LAN), and a virtual private network (VPN).

The terminal device 10 includes a communicating unit 11, a storage unit 12, an acquiring unit 13, and a control unit 14. The terminal device 10 may also include any other known functional units provided to computers, such as various input devices and sound output devices, in addition to those illustrated in FIG. 2.

The communicating unit 11 is implemented as a network interface card (NIC), for example. The communicating unit 11 is connected with the calculation server 100 and the authentication server 200 over the wire or wirelessly via the network N, and is a communication interface that controls exchanges of information between the calculation server 100 and the authentication server 200. The communicating unit 11 serves to, when the feature information is to be registered based on the user's biological information, transmit the homomorphically encrypted data $E(Pm_1(A))$ received from the control unit 14 to the calculation server 100. The communicating unit 11 also serves to, when feature information that is based on the user's biological information is to be matched, transmit the homomorphically encrypted data E(Pm$_2$(B)) received from the control unit 14 to the calculation server 100, and to receive the result of matching from the authentication server 200. The communicating unit 11 then outputs the received result of matching to the control unit 14.

The storage unit 12 is implemented as, for example, a random access memory (RAM), a semiconductor memory device such as a flash memory, or a storage device such as a hard disk or an optical disc. The storage unit 12 stores therein information to be used in the process performed by the control unit 14.

The acquiring unit 13 acquires user's biological information. The acquiring unit 13 captures an image of a finger print, a retina, an iris, a face, or blood vessels or the like, with an imaging sensor, for example, and outputs the image data of the captured image to the control unit 14 as a piece of biological information. The acquiring unit 13 may also acquire voice or handwriting as the biological information, without limitation to the image data.

The control unit 14 is implemented by, for example, causing a central processing unit (CPU) or a micro-processing unit (MPU) to execute a computer program stored in an internal storage device, using a RAM as a working area. The control unit 14 may also be implemented as an integrated circuit such as an application specific integrated circuit (ASIC) or a field programmable gate array (FPGA).

The control unit 14 includes a generating unit 15, a calculating unit 16, and an encrypting unit 17, and implements the functions of or executes the actions of information processing explained below. The control unit 14 may have any other internal configuration executing the information processing described later, without limitation to the configuration illustrated in FIG. 2. The control unit 14 is configured to, when a result of matching is received from the communicating unit 11, execute the process corresponding to the result of matching. The control unit 14 may also be configured to execute a process for controlling whether to cause the encrypting unit 17 to run the encrypting process when a piece of feature information is to be registered and matched, or only when the feature information is registered or matched.

The generating unit 15 is configured to, when the user's biological information is received from the acquiring unit 13, extract features from the biological information, and to generate feature information. When the user's biological information is an image of blood vessels, for example, the feature information may be information based on the crowdedness (density) of or the color density of the blood vessels. When the user's biological information is an image of a finger print, for example, the feature information may be extraction of branching points of the finger print, serving as the feature points. In the explanation hereunder, the feature information is sometimes referred to as a feature vector. The generating unit 15 establishes the feature vector of the time at which the feature information is registered as a feature vector A, and the feature vector of the time at which feature information is to be matched as a feature vector B, as an example, and outputs the feature vectors to the calculating unit 16. This feature vector B is the authentication data (matching information) to be matched. This authentication data may be any data to be matched with the registered information registered by a user, without limitation to the feature vector.

The calculating unit 16 then calculates an ascending order polynomial (Pm$_1$(A)) and a descending order polynomial (Pm$_2$(B)) for the feature vector A and the feature vector B, respectively, and outputs the calculation results to the encrypting unit 17. Specifically, the calculating unit 16 calculates an ascending order polynomial (Pm$_1$(A)) for the registered feature vector A, and calculates a descending order polynomial (Pm$_2$(B)) for the feature vector B to be matched.

The encrypting unit 17 then homomorphically encrypts the Pm$_1$(A) or Pm$_2$(B) calculated by the calculating unit 16 using an algorithm enabled for Hamming distance (secrecy distance) calculation with the polynomials encrypted, e.g., using a public key of a homomorphic encryption. As examples of the encryption algorithm, lattice-based homomorphic encryption, such as ideal lattice cryptography or Ring learning with errors (LWE) encryption, may be used. As the public key of the homomorphic encryption, a public key distributed in advance from the authentication server 200 is used.

The encrypting unit 17 then transmits the data E(Pm$_1$(A)) of the encrypted Pm$_1$(A) to the calculation server 100 via the communicating unit 11. The encrypting unit 17 also transmits the data E(Pm$_2$(B)) of the encrypted Pm$_2$(B) to the calculation server 100 via the communicating unit 11.

The calculation server 100 includes a communicating unit 110, a storage unit 120, and a control unit 130. The calculation server 100 may also include any other known functional units provided to computers, such as various input devices and sound output devices, in addition to those illustrated in FIG. 2.

The communicating unit 110 is implemented as a NIC, for example. The communicating unit 110 is connected with the terminal device 10 and the authentication server 200 over the wire or wirelessly via the network N, and is a communication interface that controls exchanges of information with the terminal device 10 and the authentication server 200. The communicating unit 110 receives the homomorphically encrypted data E(Pm$_1$(A)) or data E(Pm$_2$(B)) from the terminal device 10. The communicating unit 110 receives the data E(Pm$_1$(A)), when the feature information is to be registered based on user's biological information, for example. The communicating unit 110 receives the data E(Pm$_2$(B)) when the feature information is to be matched based on user's biological information, for example. The communicating unit 110 then outputs the received data E(Pm$_1$(A)) or data E(Pm$_2$(B)) to the control unit 130. The communicating unit 110 also transmits, when a result of the Hamming distance calculation is received from the control unit 130, the calculation result to the authentication server 200.

The storage unit 120 is implemented as, for example, a RAM, a semiconductor memory device such as a flash memory, or a storage device such as a hard disk or an optical disc. The storage unit 120 includes a registered information storage unit 121. The storage unit 120 stores therein information used in the process performed by the control unit 130.

The registered information storage unit 121 stores therein the homomorphically encrypted data E(Pm$_1$(A)), which is the user's registered information received from the terminal device 10, in a manner mapped with a user ID (identifier), for example, so that each user can be identified.

The control unit 130 is implemented by, for example, causing a CPU or an MPU to execute a computer program stored in an internal storage device, using a RAM as a working area. The control unit 130 may also be implemented as an integrated circuit such as an ASIC or an FPGA. The control unit 130 includes a calculating unit 131 and a transmitting unit 132, and implements the functions of or executes the actions of information processing explained below. The control unit 130 may have any other internal configuration for executing the information processing described later, without limitation to the configuration illustrated in FIG. 2.

The calculating unit 131 is configured to, when feature information is to be matched based on user's biological information, calculate the Hamming distance (secrecy distance $E(d(A, B))$) between the data $E(Pm_2(B))$ received from the terminal device 10 and the user's registered information (data $E(Pm_1(A))$).

The calculating unit 131 is also configured to generate a random binary vector T that is different from the data $E(Pm_1(A))$. Assuming that the user's registered information (data $E(Pm_1(A))$) is a template in the biometric authentication, this random binary vector T may be referred to as a dummy template (fake template) that is different from the template. The calculating unit 131 then calculates the Hamming distance (secrecy distance $E(d(B, T))$) between the generated binary vector T and the data $E(Pm_2(B))$ received from the terminal device 10.

The transmitting unit 132 transmits the two secrecy distances $E(d(A, B))$ and $E(d(B, T))$ calculated by the calculating unit 131 to the authentication server 200 via the communicating unit 110.

The authentication server 200 includes a communicating unit 210, a storage unit 220, and a control unit 230. The authentication server 200 may also include any other known functional units provided to computers, such as various input devices and sound output devices, in addition to those illustrated in FIG. 2.

The communicating unit 210 is implemented as a NIC, for example. The communicating unit 210 is connected with the terminal device 10 and the calculation server 100 over the wire or wirelessly via the network N, and is a communication interface that controls exchanges of information with the terminal device 10 and the calculation server 100. The communicating unit 210 receives the Hamming distances (the secrecy distances $E(d(A, B))$ and $E(d(B, T))$) from the calculation server 100. The communicating unit 210 outputs the received Hamming distance to the control unit 230. The communicating unit 210 also transmits, when a result of matching is received from the control unit 230, the result of matching to the terminal device 10.

The storage unit 220 is implemented as, for example, a RAM, a semiconductor memory device such as a flash memory, or a storage device such as a hard disk or an optical disc. The storage unit 220 stores therein the information used in the process performed by the control unit 230.

The control unit 230 is implemented by, for example, causing a CPU or an MPU to execute a computer program stored in an internal storage device, using a RAM as a working area. The control unit 230 may also be implemented as an integrated circuit such as an ASIC or an FPGA. The control unit 230 includes a determining unit 231 and a fraud detecting unit 232, and implements the functions of or executes the actions of information processing explained below. The control unit 230 may also include any other internal configuration for executing the information processing described later, without limitation to the configuration illustrated in FIG. 2. The control unit 230 also manages the public key and the secret key of the homomorphic encryption, and distributes the public key to the terminal device 10 belonging to the authentication system 1 via the communicating unit 210.

The determining unit 231 determines whether the Hamming distances (secrecy distance $E(d(A, B))$ and $E(d(B, T))$) received from the calculation server 100 are smaller than a preset threshold. Specifically, when the Hamming distance is received from the communicating unit 210, the determining unit 231 decrypts the received Hamming distances with the secret key of the homomorphic encryption. The determining unit 231 then determines whether the Hamming distances of the decrypted plaintexts are smaller than the threshold.

If the Hamming distance with respect to the user's registered information (secrecy distance $E(d(A, B))$) in the decrypted plaintext is smaller than the threshold, the determining unit 231 determines that the authentication has succeeded (OK). If the Hamming distance with respect to the user's registered information (secrecy distance $E(d(A, B))$) in the decrypted plaintext is equal to or more than the threshold, the determining unit 231 determines that the authentication has failed (NG). The determining unit 231 may establish the threshold as approximately a half of the Hamming distance bit string, e.g., 1024 bits, as the threshold, when the Hamming distance is a 2048-dimensional bit string, for example. To determine whether the authentication has succeeded, the determining unit 231 determines whether (Hamming distance)>2048−(threshold) is established. If (Hamming distance)>2048−(threshold) is established, the determining unit 231 may determine that the authentication has succeeded (OK). The determining unit 231 transmits the determination result to the terminal device 10 via the communicating unit 210, as the result of matching.

For the Hamming distance (secrecy distance $E(d(B, T))$) with respect to the dummy template, the determining unit 231 outputs a result of determining whether the Hamming distance in the decrypted plaintext is smaller than the threshold to the fraud detecting unit 232.

Based on the result of determining whether the Hamming distance (secrecy distance $E(d(B, T))$) with respect to the dummy template is smaller than the threshold, the fraud detecting unit 232 detects whether the data $E(Pm_2(B))$ transmitted for matching is fraudulent (detects the legitimacy). The fraud detecting unit 232 outputs a result of fraud detection as a display on a display device (not illustrated) such as a display, or a notification to a preset address of an administrator.

The fraud detected by the fraud detecting unit 232 is fraud in the data $E(Pm_2(B))$ generated in the Hamming distance calculation in such a manner that output is a distance that is smaller than the threshold for allowing the authentication to be successful, because the integer e is adjusted as appropriate, for example.

If the data $E(Pm_2(B))$ is legitimate data with no illegitimacy, the Hamming distance (secrecy distance $E(d(B, T))$) with respect to the dummy template will represent a match between different persons. Therefore, the distance of the legitimate data will fall into a distance distribution representing matches between different persons. If the data $E(Pm_2(B))$ is fraudulent, the distance will fall into a distance distribution representing matches between the identical person with a template, because the integer e is adjusted as appropriate, for example. The Hamming distance (secrecy distance $E(d(B, T))$) of the fraudulent data with respect to the dummy template therefore falls into the distance distribution representing matches between the identical person.

Hence, if the Hamming distance (secrecy distance $E(d(B, T))$) with respect to the dummy template is smaller than the threshold, the fraud detecting unit 232 detects fraud in the data $E(Pm_2(B))$ transmitted for matching. The fraud detecting unit 232 may establish the threshold as approximately a half of the Hamming distance bit string, e.g., 1024 bits, as the threshold, when the Hamming distance is a 2048-dimensional bit string, for example. The fraud detecting unit 232 may detect fraud by determining whether (Hamming distance)>2048−(threshold), and detect that the data $E(Pm_2(B))$ is fraudulent if (Hamming distance)>2048−(threshold).

Figure 3:
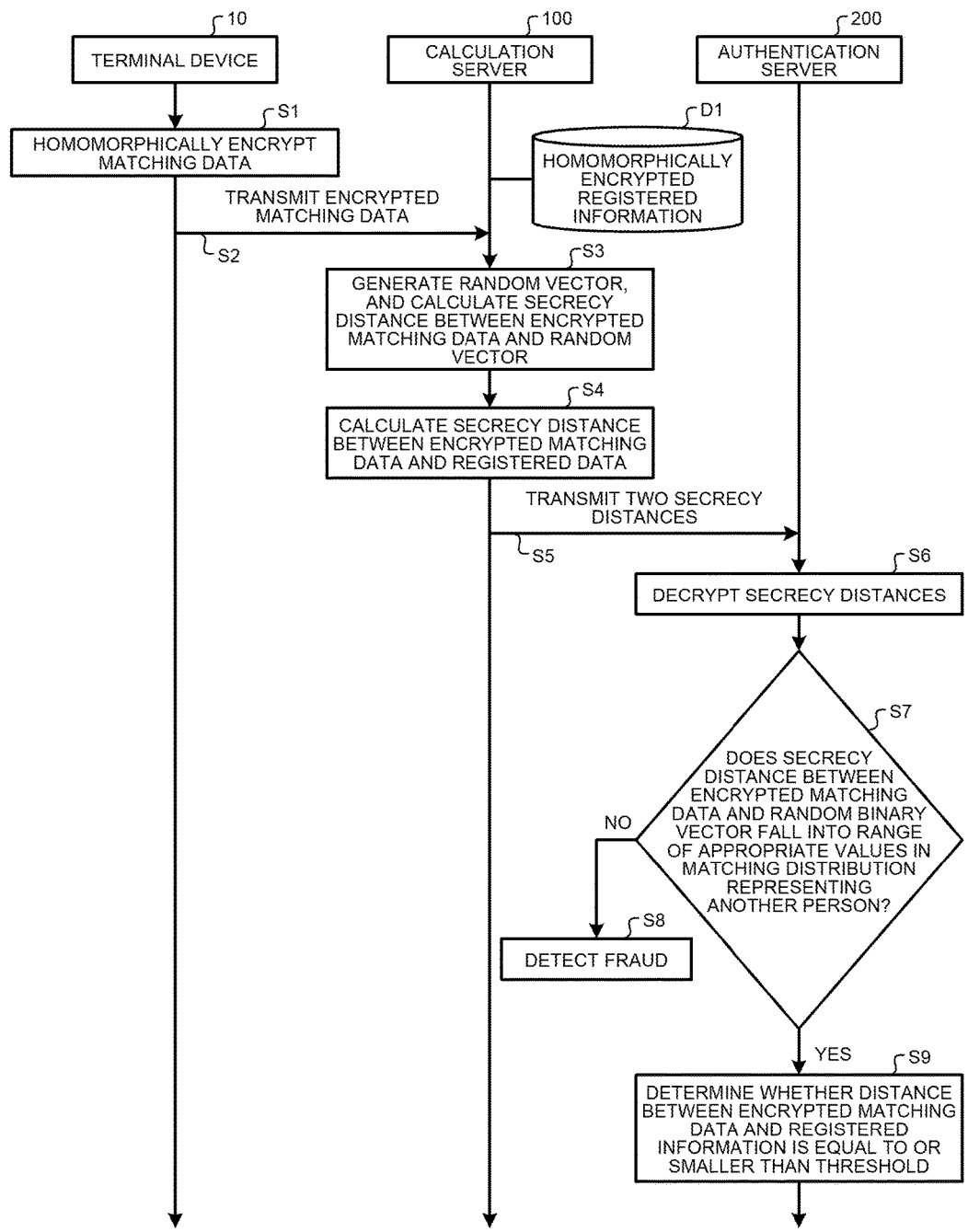
FIG. 3 is a ladder chart illustrating an exemplary operation of the authentication system according to the embodiment.

FIG. 3 is a ladder chart illustrating an exemplary operation of the authentication system 1 according to the embodiment. More specifically, FIG. 3 illustrates an exemplary operation of user authentication. As illustrated in FIG. 3, the terminal device 10 performs homomorphic encryption based on acquired biological information (S1), and transmits the encrypted authentication data (data $E(Pm_2(B))$) to the calculation server 100(S2).

In the calculation server 100 receiving the encrypted authentication data (data $E(Pm_2(B))$), the calculating unit 131 generates a random binary vector T (dummy template) that is different from the homomorphically encrypted registered information D1 (data $E(Pm_1(A))$) that is the user's registered information. The calculating unit 131 then calculates the Hamming distance (secrecy distance $E(d(B, T))$) of the encrypted authentication data (data $E(Pm_2(B))$) with respect to the generated binary vector T (S3).

The calculating unit 131 then calculates the Hamming distance (secrecy distance $E(d(A, B))$) of the encrypted authentication data (data $E(Pm_2(B))$) with respect to the homomorphically encrypted registered information D1 (data $E(Pm_1(A))$) that is the user's registered information (S4).

The transmitting unit 132 then transmits the two secrecy distances $E(d(A, B))$ and $E(d(B, T))$ calculated by the calculating unit 131 to the authentication server 200 (S5).

In the authentication server 200 receiving the two secrecy distances $E(d(A, B))$ and $E(d(B, T))$, the determining unit 231 decrypts the two secrecy distances with the secret key of the homomorphic encryption (S6).

The determining unit 231 then determines whether the Hamming distance (secrecy distance $E(d(B, T))$) between the random binary vector T and the encrypted authentication data (data $E(Pm_2(B))$) falls into a range of appropriate values in the matching distribution representing matches with a different person (S7).

Figure 4:
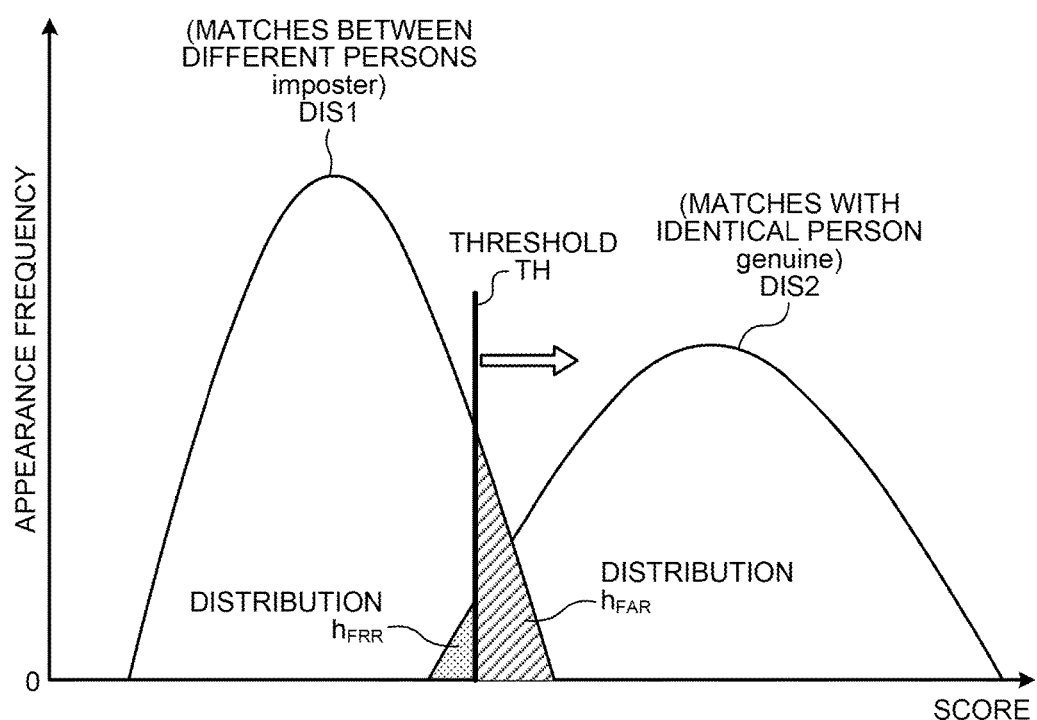
FIG. 4 is a schematic for explaining matching distributions.

FIG. 4 is a schematic for explaining the matching distributions, illustrating the frequencies at which a Hamming distance (score) between two feature vectors appears. As illustrated in FIG. 4, output from the feature vectors of the identical person is a high-score (that is, short-distance) distribution DIS2. Output from the feature vectors of different persons is a low-score (that is, long-distance) distribution DIS1. In the field of biometric authentication, a threshold TH for the authentication is determined, based on the distance distributions, so that the false acceptance rate (FAR) is balanced with the false rejection rate (FRR).

In the spoofing attack by means of transmissions of fraudulent matching data, the attacker will transmit fake authentication data falling into the distribution DIS2, in which the authentication data is matched with a template. To detect such an attack, the determining unit 231 detects fraud in the authentication data based on whether the distance (Hamming distance) of such authentication data with respect to the dummy template (random binary vector T) falls into the distribution DIS2 corresponding to the matches between the identical person.

For example, if the data is legitimate authentication data, the distance between the data and the dummy template will fall into the distribution DIS1, because the distance represents a match with some person other than the registered user. However, if the matching data is fraudulent, the data will fall into the distribution DIS2 with respect to a template. The distance between the fraudulent matching data and the dummy template will therefore fall into the distribution DIS2. The authentication server 200 detects fraud by using this characteristic of fraudulent matching data.

Specifically, the determining unit 231 determines whether the Hamming distance (secrecy distance $E(d(B, T))$) of authentication data with respect to the random binary vector T is smaller than the threshold, as described earlier, and the fraud detecting unit 232 detects fraud based on the determination result. If the Hamming distance (secrecy distance $E(d(B, T))$) with respect to the random binary vector T is smaller than the threshold, without falling into the distribution DIS1 corresponding to the matches between different persons (NO at S7), the fraud detecting unit 232 detects fraud in the encrypted authentication data (S8).

If the Hamming distance (secrecy distance $E(d(B, T))$) with respect to the random binary vector T is not smaller than the threshold, and falls into the distribution DIS1 corresponding to the matches between different persons (YES at S7), the fraud detecting unit 232 detects that the encrypted authentication data is normal. The determining unit 231 then determines whether the authentication is successful (OK) or the authentication fails (NG) by determining whether the Hamming distance (secrecy distance $E(d(A, B))$) with respect to the user's registered information is equal to or smaller than the threshold (S9).

As described above, the calculation server 100 receives an input of data $E(Pm_2(B))$ encrypted with an encryption algorithm enabled for Hamming distance calculation with encrypted data. The calculation server 100 then calculates a secrecy distance $E(d(B, T))$ of the received data $E(Pm_2(B))$ with respect to a dummy template that is different from the user's registered information D1 that is homomorphically encrypted with the encryption algorithm. The authentication server 200 then determines the legitimacy of the data $E(Pm_2(B))$ based on whether the secrecy distance $E(d(B, T))$ calculated by the calculation server 100 falls into a distance distribution representing matches with a person different from the user him/herself. Therefore, the authentication system 1 can detect fraud in the data $E(Pm_2(B))$ that is the authentication data used in authentication.

Modification

Figure 5:
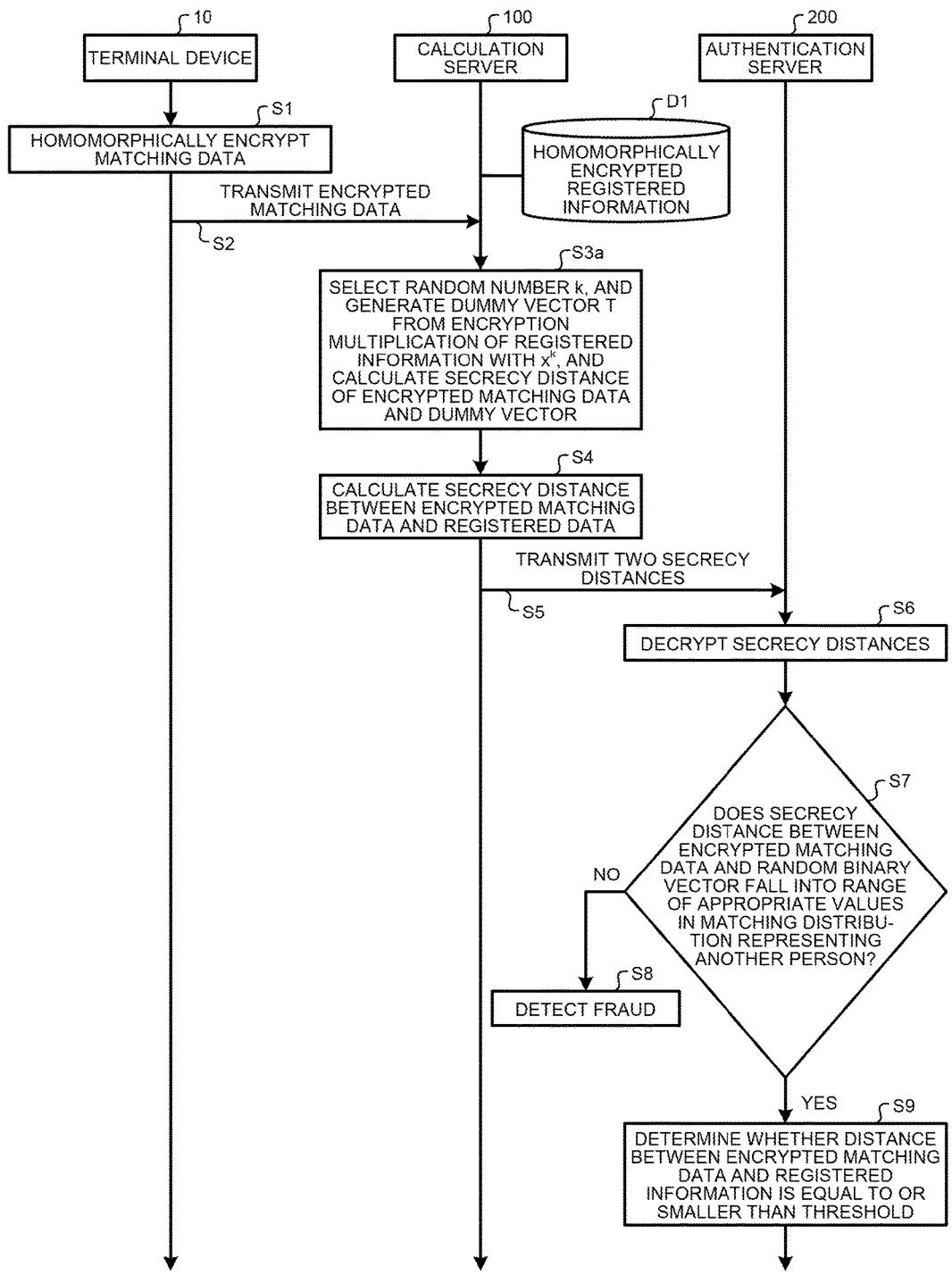
FIG. 5 is a ladder chart illustrating another exemplary operation of the authentication system according to the embodiment.

FIG. 5 is a ladder chart illustrating an exemplary operation of the authentication system 1 according to a modification. As illustrated in FIG. 5, the modification is different from the embodiment described above in that the calculation server 100 creates the dummy template differently (S3a). In the modification, the calculation server 100 generates a dummy template from the legitimate template stored in the registered information storage unit 121.

Specifically, the calculating unit 131 selects a random number k, and generates the random binary vector T (dummy vector) by encryption multiplying a unitary polynomial $x^k$ by the homomorphically encrypted registered information D1 (data $E(Pm_1(A))$) that is the user's registered information. The calculating unit 131 then calculates a Hamming distance (secrecy distance $E(d(B, T))$) of the encrypted authentication data (data $E(Pm_2(B))$) with respect to the generated binary vector T (S3a).

With the homomorphic encryption with which polynomial operations can be performed, the encryption multiplication is performed as $x^k * E(Pm_2(A))$, for example. A template A' after the encryption multiplication will represent a vector with its components shifted by k with respect to the original template A ($a0, a1, \ldots$), and has a components ($a_{k-1}, a_{k-2}, \ldots$). According to the modification, because a dummy template that is different from $E(Pm_1(A))$ can be generated using the encrypted $E(Pm_1(A))$, fraud can be detected while ensuring privacy.

The elements included in each of the units illustrated in the drawings do not necessarily need to be physically configured as illustrated. In other words, specific configurations in which the units are distributed or integrated are not limited to those illustrated in the drawings, and any part of or the whole of each of the units may be functionally or physically distributed or integrated to or into any units, depending on various loads, utilizations, or the like. For example, units such as the calculating unit 131 and the transmitting unit 132 according to the embodiment may be integrated.

Furthermore, a part of or the whole of various processing functions performed in each of the devices may be executed by a CPU (or a micro-computer such as an MPU or a micro-controller unit (MCU)). Alternatively, a part of or the whole of the various processing functions may be implemented as a computer program parsed and executed by a CPU (or a micro-computer such as an MPU or an MCU), or as hardware implementing a wired logic.

Figure 6:
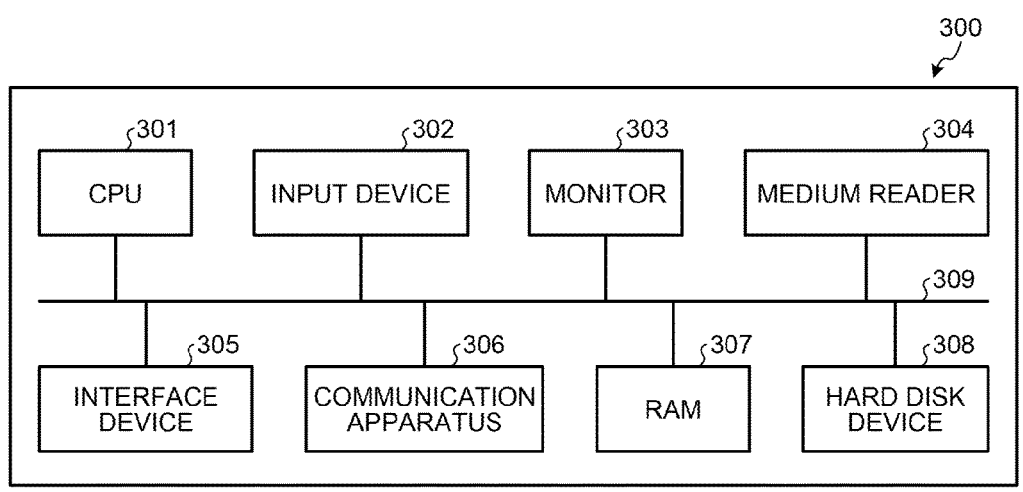
FIG. 6 is an explanatory schematic illustrating an exemplary computer executing an information processing program.

The various processes described in the embodiment may be implemented by causing a computer to execute a computer program prepared in advance. Explained now is an exemplary computer executing a computer program having the same functions as those explained in the embodiment. FIG. 6 is an explanatory schematic illustrating the exemplary computer executing an information processing program.

As illustrated in FIG. 6, this computer 300 includes a CPU 301 executing various operations, an input device 302 receiving data inputs, and a monitor 303. The computer 300 also includes a medium reader 304 for reading a computer program and the like from a storage medium, an interface device 305 for connecting with various devices, and a communication apparatus 306 for connecting with other devices over the wire or wirelessly. The computer 300 also includes a RAM 307 temporarily storing therein various types of information, and a hard disk device 308. Each of these devices 301 to 308 are connected to a bus 309.

The hard disk device 308 stores therein an information processing program having the same functions as those of the processing units explained in the embodiment. The hard disk device 308 stores therein various types of data for implementing the information processing program. The input device 302 receives an input of a password from a user, or an input of management information from an administrator of the computer 300, for example. The monitor 303 displays a screen for entering a password for authentication, or various types of information for allowing the administrator of the computer 300 to perform maintenance, for example. A device such as a printer is connected to the interface device 305. The communication apparatus 306 is connected to, for example, the network N.

The CPU 301 performs various processes by reading computer programs stored in the hard disk device 308, loading the computer programs onto the RAM 307, and executing the computer programs. Such computer programs can cause the computer 300 to function as the processing units explained in the embodiment.

The information processing program does not necessarily need to be stored in the hard disk device 308. For example, the computer 300 may read the computer program stored in a storage medium that is readable by the computer 300, and execute the computer program. Examples of the storage medium readable by the computer 300 include a portable recording medium such as a compact disc read-only memory (CD-ROM), a digital versatile disc (DVD), and a universal serial bus (USB) memory, a semiconductor memory such as a flash memory, and a hard disk drive. The information processing program may also be stored in a device connected to a network such as a public circuit, the Internet, or a local area network (LAN), and the computer 300 may read the information processing program over the network, and execute the information processing program.

According to one aspect of the present invention, fraudulent matching information in authentication-related matching information can be detected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing method comprising:
receiving an input of matching information encrypted with an encryption algorithm allowing a Hamming distance to be calculated with the matching information encrypted, using a processor;
calculating a first Hamming distance between the received matching information and registered information that is different from encrypted registered information of a user, the registered information being encrypted with the encryption algorithm and a second Hamming distance between the received matching information and the registered information of the user, using the processor; and
determining that a user corresponding to the matching information is the user corresponding to the registered information when the calculated first Hamming distance falls into a distance distribution representing matches with another person that is different from the user and the calculated second Hamming distance falls into a distance distribution representing matches with the user, using the processor.

2. The information processing method according to claim 1, wherein, at the determining, the matching information is determined to be illegitimate when the calculated first Hamming distance falls into the distance distribution representing matches with the user, but does not fall into the distance distribution representing matches with the another person.

3. The information processing method according to claim 1, wherein the encryption algorithm uses homomorphic encryption.

4. The information processing method according to claim 3, wherein at the calculating, the different registered information is generated by multiplying a random number by the registered information of the user.

5. A non-transitory computer-readable recording medium having stored therein an information processing program that causes a computer to execute a process comprising:
receiving an input of matching information encrypted with an encryption algorithm allowing a Hamming distance to be calculated with the matching information encrypted, using a processor;
calculating a first Hamming distance between the received matching information and registered information that is different from encrypted registered information of a user, the registered information being encrypted with the encryption algorithm and a second Hamming distance between the received matching information and the registered information of the user, using the processor; and determining that a user corresponding to the matching information is the user corresponding to the registered information when the calculated first Hamming distance falls into a distance distribution representing matches with another person that is different from the user and the calculated second Hamming distance falls into a distance distribution representing matches with the user, using the processor.

6. An information processing apparatus comprising:

a processor that executes a process including:

receiving an input of matching information encrypted with an encryption algorithm allowing a Hamming distance to be calculated with the matching information encrypted;

calculating a first Hamming distance between the received matching information and registered information that is different from encrypted registered information of a user, the registered information being encrypted with the encryption algorithm and a second Hamming distance between the received matching information and the registered information of the user; and determining that a user corresponding to the matching information is the user corresponding to the registered information when the calculated first Hamming distance falls into a distance distribution representing matches with another person that is different from the user and the calculated second Hamming distance falls into a distance distribution representing matches with the user.

\* \* \* \* \*